US006171035B1

(12) United States Patent
McLaurin et al.

(10) Patent No.: US 6,171,035 B1
(45) Date of Patent: Jan. 9, 2001

(54) REARPOINT SECUREMENT SYSTEM

(76) Inventors: Colin McLaurin, Rte. 1, Box 284, Crozet, VA (US) 22932; Greg Shaw, 102 Wendover La., Charlottesville, VA (US) 22911

( * ) Notice: Under 35 U.S.C. 154(b), the term of this patent shall be extended for 0 days.

(21) Appl. No.: 09/056,173

(22) Filed: Apr. 7, 1998

Related U.S. Application Data

(60) Provisional application No. 60/042,786, filed on Apr. 7, 1997.

(51) Int. Cl.[7] .......... B60P 7/08

(52) U.S. Cl. .......... 410/7; 410/3; 410/4

(58) Field of Search .......... 410/3, 4, 7, 9, 410/19, 22, 51; 296/65.04; 248/503.1; 297/DIG. 4; 280/304.1

(56) References Cited

U.S. PATENT DOCUMENTS

| | | | | |
|---|---|---|---|---|
| 4,265,478 | | 5/1981 | Korsgaard . | |
| 4,588,340 | * | 5/1986 | Howard | 410/7 |
| 4,623,289 | * | 11/1986 | Apostolos | 410/7 |
| 4,671,713 | * | 6/1987 | Lenkman | 410/7 |
| 4,690,364 | | 9/1987 | Constantin . | |
| 4,754,946 | | 7/1988 | Constantin . | |
| 4,973,022 | | 11/1990 | Mayland . | |
| 5,186,585 | * | 2/1993 | Sousa et al. | 410/9 |
| 5,344,265 | | 9/1994 | Ullman | 410/3 |
| 5,391,030 | * | 2/1995 | Lee | 410/12 |
| 5,489,170 | * | 2/1996 | Inoue et al. | 410/7 |
| 5,567,095 | * | 10/1996 | James et al. | 410/7 |
| 5,888,038 | * | 3/1999 | Ditch et al. | 410/7 |

* cited by examiner

*Primary Examiner*—Stephen T. Gordon
(74) *Attorney, Agent, or Firm*—Rosenthal & Putterman

(57) ABSTRACT

A securement device uses a pedestal secured to a support structure and comprising an outer casing with securing brackets. A receiving area is proximate one end, A mid-brace is secured at both ends to the interior. A release bar is pivotally affixed at one end with the other end extending through the casing. A vertical sleeve is secured between the mid-brace and the partially open top and contains a receiving area and an open channel. A spring is placed within the vertical sleeve and a capture rod, having a wedged receiving area, retained within the sleeve, resting on the spring. A draw rod is permanently secured to the capture rod at one end and slideably connected to the release bar at the other end. A locking member has a locking rod pivotally connected to the mid-brace and a locking bar affixed at a right angle. A release rod is affixed to the locking bar and extends into the partially open first end. A spring bar maintains pressure on the locking rod. A mobility aid connector has an attachment bar with releasable attachment locks. A tongue unit has a receiving area at one end and is attached to a hinge at the other end. The hinge provides limited horizontal movement between the tongue and the attachment bar. A brace is secured to the mobility aid frame and has receiving areas which are positioned to receive the releasable attachment locks.

13 Claims, 9 Drawing Sheets

REARPOINT SECUREMENT SYSTEM

REFERENCE TO RELATED APPLICATION

This application claims priority from U.S. Provisional Patent Application Serial No. 60/042,786 filed Apr. 7, 1997.

BACKGROUND OF THE INVENTION

1. Field of the Invention

The invention relates to a system for securing mobile aids, such as wheelchairs, to prevent forward movement from occurring during abrupt movement, such as a crash.

2. Brief Description of the Prior Art

The present invention relates to securement systems for rollable mobility aids, and more particularly to a system designed for securing a rollable mobility aid within a vehicle.

Various devices are known which allow physically disabled people to travel independently. Such devices, known generically as rollable mobility aids (or mobility aids), include wheelchairs, three-wheeled scooters, power bases, etc.

There are instances where an occupant of such a mobility aid must, for safety or other reasons, secure it to a surrounding structure, such as when the occupant boards a transit vehicle such as a van, bus or train. Safety laws require that the transit vehicle be equipped with a device for securing the mobility aid within the vehicle.

The problem for designers of mobility aid securement systems is to design such securement devices with superior, fail-safe securement capabilities while at the same time being easy and quick to operate by both the mobility aid occupant and the transit driver. Several conventional systems have been proposed in the form of wheelchair restraint devices, but none have been completely satisfactory. For example, some conventional devices are strap/belt based which makes them difficult to use, as well as being time-consuming for transit vehicle drivers. Other proposals include mechanisms for clamping the wheels of a wheelchair in place but such mechanisms can damage the wheels and their corresponding rims if the bus swerves, is involved in an accident, or otherwise moves in such a way that causes the wheelchair to move with respect to the mechanism.

Still other conventional restraining devices include a post which extends downwardly from the wheelchair and is engaged by a vehicle-floor-mounted locking assembly such as is shown in U.S. Pat. Nos. 4,754,946 and 4,690,364, both issued to Constantin, and U.S. Pat. No. 4,973,022 issued to Mayland. Like the wheel clamp restraining devices, such floor-mounted restraining devices may be easily damaged in accident conditions because tilting of the wheelchair could cause the post to bend. Even worse, if the bus rides over a large bump, the wheelchair might be forced upward and become dislodged from the device. Such a result is obviously unacceptable. Further, the post, because it must be close to the ground, reduces wheelchair ground clearance.

Another conventional proposal is proposed in U.S. Pat. No. 4,265,478 to Korsgaard which discloses a thin latch plate mounted to tall, fixed, free-standing pillar stands that is latchable to a release bar mounted on a wheelchair. The restraining system in Korsgaard is unwieldy and its thin latch plate does not provide a latch mechanism that can withstand the rough treatment commonly encountered on transit vehicles. Such a latch mechanism will also be lacking in ability to resist tilting of the wheelchair.

In U.S. Pat. No. 5,344,265 a securement device is disclosed which locks the wheelchair to a box which contains dual locking devices.

The present invention provides a system which promotes securement of mobility aids to the interior structure of transit vehicles, and which overcomes the drawbacks and limitations of prior art devices. The disclosed device provides a system which achieves sustained securement in normal and accident conditions on the transit vehicle, and ensures that the mobility aid can be released from securement under all conditions. The system is easy to use by both mobility aid occupants and transit vehicle operators, requires a minimum of training and can be easily retrofitted to existing transit vehicles and to existing mobility aids.

SUMMARY OF THE INVENTION

A securement device for securing a mobility aid to a support structure is disclosed. The device has a docking pedestal capable of being secured to the support structure. The hollow pedestal comprises an outer casing having a partially open first end, brackets at a second end, and an open port. A receiving area, such as will accomodate a tongue, is proximate the first end. A mid-brace is secured to the hollow interior of the casing between the first and second ends. A release bar is pivotally affixed to the hollow interior at its first end with the second end extending through the open port. A vertical sleeve is secured at one end to the mid-brace and at the other end to the partially open first end. A receiving area and an open channel are placed along its length proximate the partially open first end. A spring is placed within the vertical sleeve with a first end being proximate the mid-brace. A capture rod is retained within the sleeve one end proximate the spring and the other end proximate the partially open end. A locking member receiving area is placed along the length of the capture rod. A draw rod is permanently secured to the capture rod at the first end and slideably connected to the release bar at the second end. A spring connects the release bar to the mid-brace, the pressure maintaining the release bar in an upward position when at rest.

A locking member comprises a locking rod which is pivotally connected to the mid-brace and a locking bar at right angles and affixed to the locking bar. A release rod is affixed to the locking bar and extending into the partially open first end. A spring bar is secured to the hollow interior at a first end and in tension contact with the locking rod.

A mobility aid connector has an attachment bar which is provided with releasable attachment locks. A tongue unit has a capture bar receiving area at one end and a hinge attachment area at the other end. A hinge is affixed to the attachment bar at its first end and has a tongue attachment area its a second end. The hinge provides horizontal movement between the tongue and the attachment bar. The attachment bar is provided with stops which limit the swing of the hinge.

A mobility aid brace is secured to a portion of the mobility aid frame and has releasable attachment lock receiving areas which are positioned to receive the releasable attachment locks.

To use the device, the mobility aid releasable attachment locks are placed into the releasable attachment lock receiving areas. The mobility aid is positioned to align the tongue of the connector with the tongue receiving area within the pedestal. As the tongue is moved to come into contact with the release rod, the locking bar is moved to release contact with the capture rod locking means receiving area. The movement of the locking bar further compresses the spring bar. Once released, the capture rod is, through the action of the spring, pushed through said partially open area and the capture bar receiving area in the tongue. The tongue is then locked within the tongue receiving area.

To release the mobility aid, the release bar handle is pushed downward, pulling the draw rod and said capture rod downward. The locking bar, due to the pressure applied by compression of said spring bar, enters the capture rod locking area, preventing movement of the capture rod. The pressure of the spring rod maintains the locking bar within said capture rod locking area until released as noted above.

BRIEF DESCRIPTION OF THE DRAWINGS

The advantages of the instant disclosure will become more apparent when read with the specification and the drawings, wherein.

DETAILED DESCRIPTION OF THE INVENTION

The ability to restrain, and easily release, rollable mobility aids, such as a wheelchair, in a moving vehicle is critical to allow the users of these aids to lead fulfilling lives. The disclosed device allows for rapid connection and release of mobility aids within the vehicle. Within the disclosure herein, reference will be made to wheelchairs being connected to vans, however, other uses will become evident to those skilled in the art.

Figure 1:
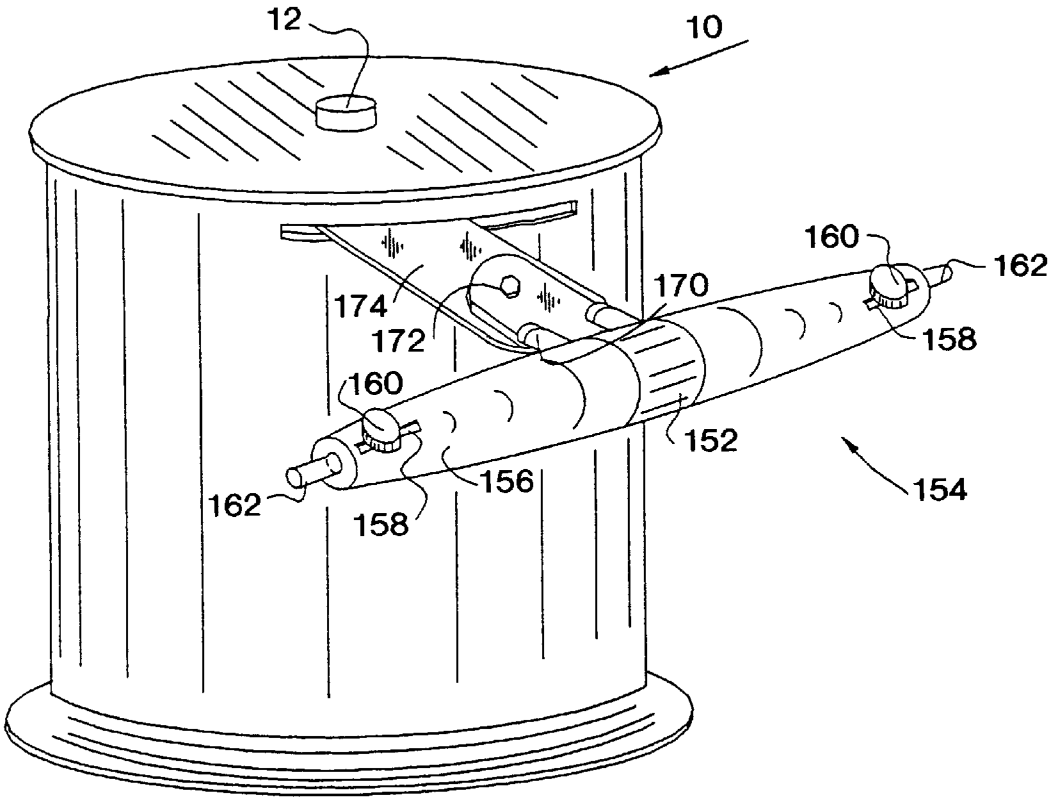
FIG. 1 is a perspective view of the securement base and chair connector.

FIG. 1 illustrates the securement device 10 with the docking pedestal 12 and chair connector 154 in place. The chair connector 154, shown unconnected to a chair, is more clearly illustrated and described further herein in conjunction with FIG. 6. The docking pedestal 12 must be manufactured from a material, such as steel tubing, which provides the appropriate strength and stability required to safely secure the chair to the vehicle. The illustrated docking pedestal 12 is manufactured from ¼ inch thick steel tubing and has been tested in crash testing facilities at the University of Virginia, Charlottesville, Va. Any variations in materials recommended herein should also meet the safety criteria met by the disclosed materials. As can be seen in FIG. 1, the chair connector 154 is attached to a connector tongue 174 which interacts with the pedestal 12. The tongue 174 illustrated is manufactured from ¾ inch 20/24 aluminum alloy with a T3 or T6 classification, although other equivalent materials can be used which provide the required strength and prevent torquing.

Figure 2:
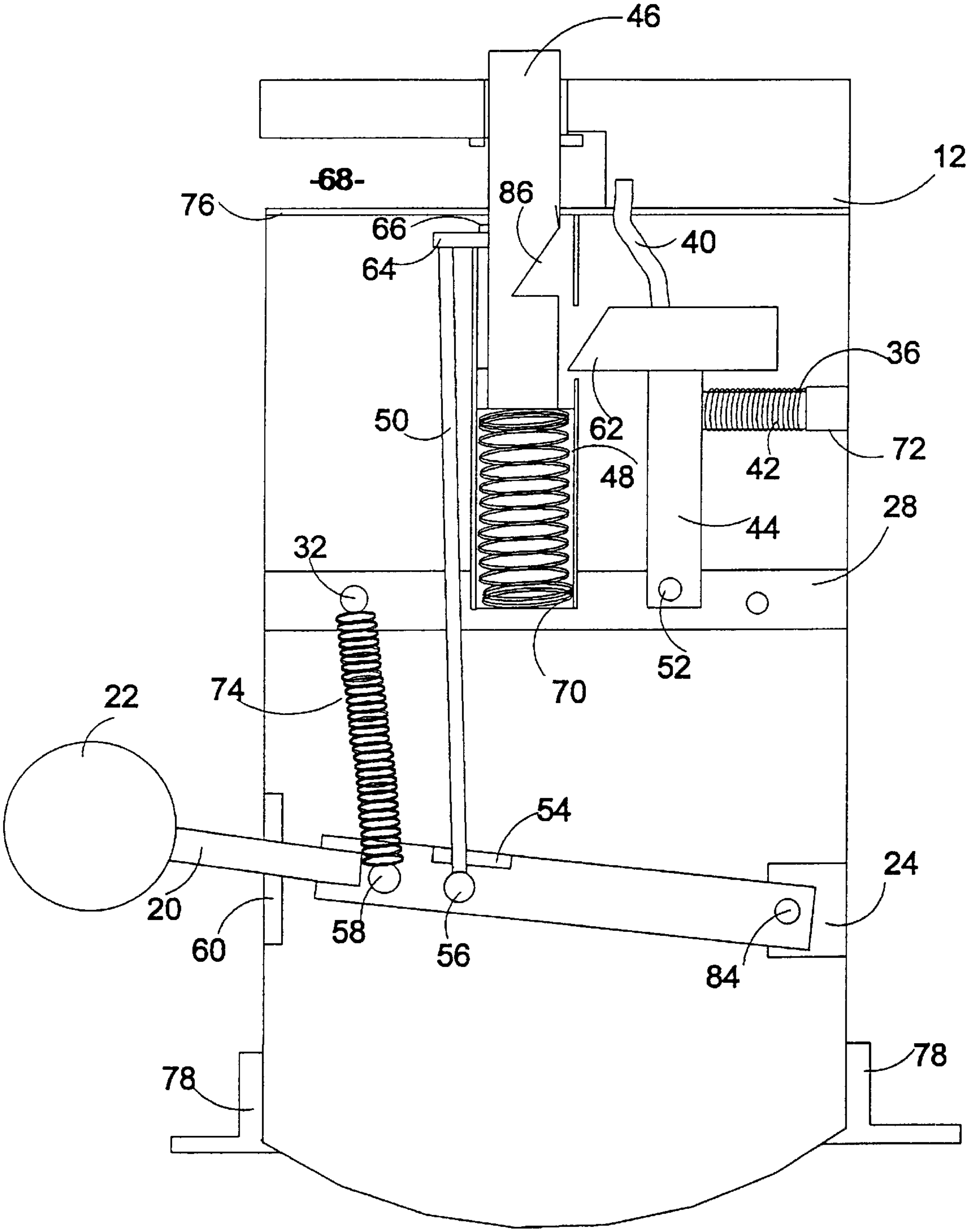
FIG. 2 is cutaway side view of the securement base of FIG. 1 in a locked position.
Figure 3:
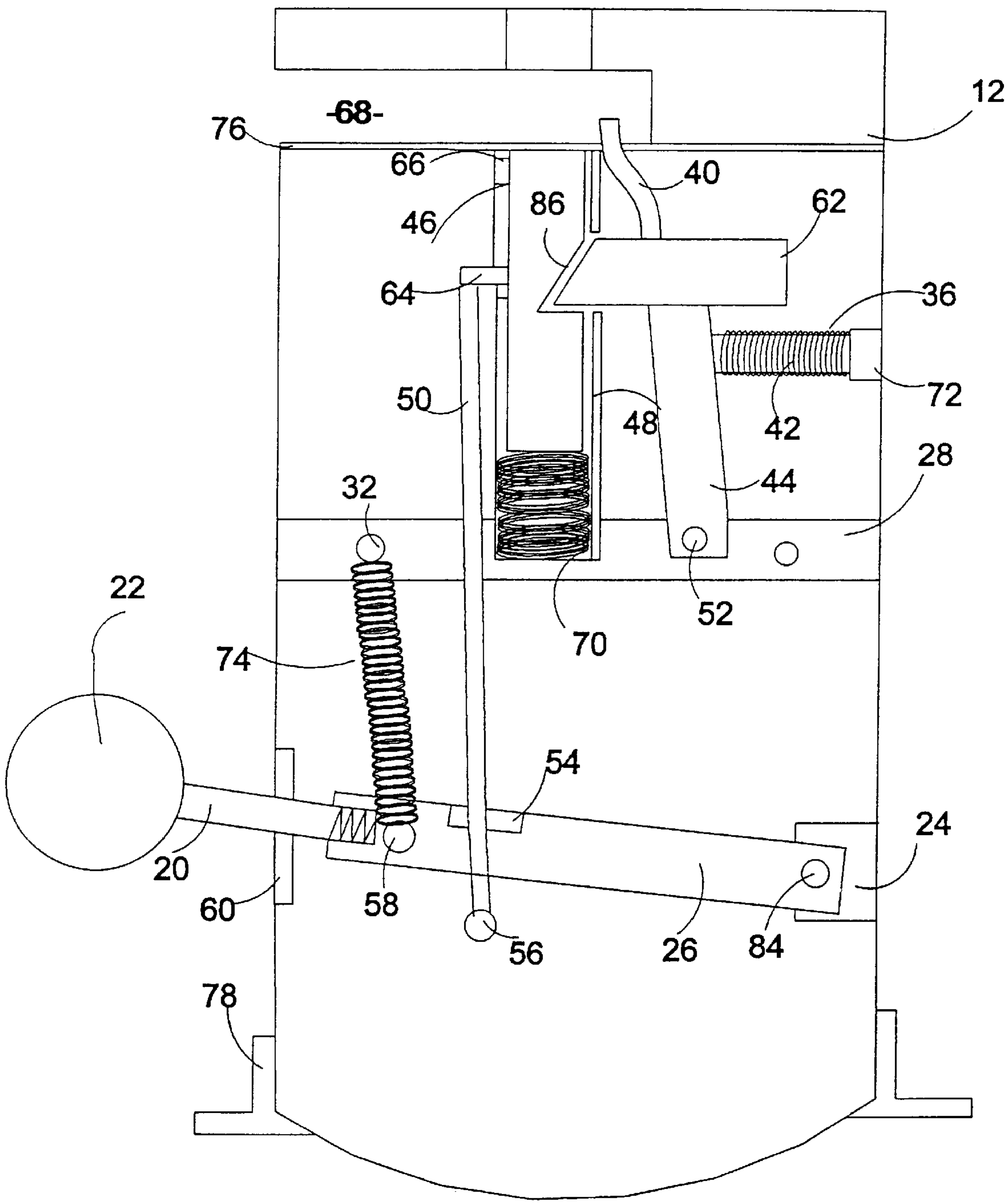
FIG. 3 is a cutaway side view of the securement base of FIG. 1 in a receiving position.
Figure 4:
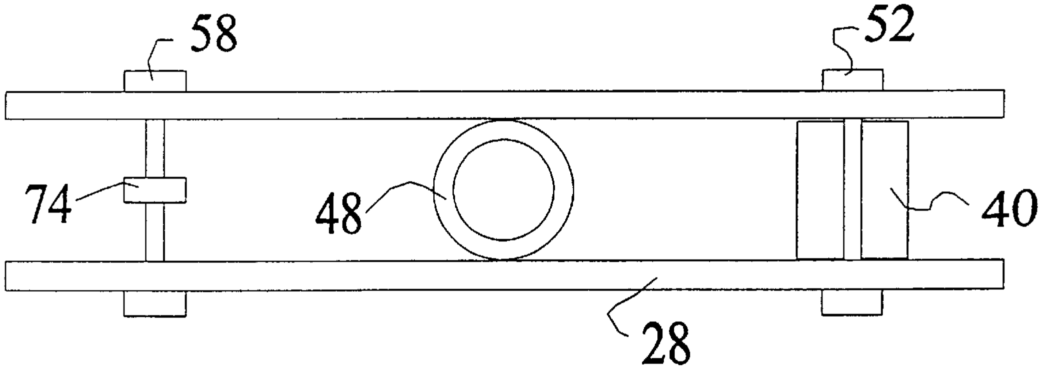
FIG. 4 is a bottom view of the mid-brace for use with the securement base of FIG. 1.

FIG. 2 illustrates the interior of the pedestal 12, locked to the support structure through use of brackets 78, in the activated, locked position. The pedestal 12 is provided with a receiving channel 68 which receives the tongue 174 (not shown) and, as described further herein, activates the capture rod 46 to the raised position to lock the wheelchair in place. A capture rod 46, which is held within a rod sleeve 48, is placed at approximately the center of the pedestal 12. The dimensioning between the capture rod 46 and rod sleeve 48 allows the capture rod 46 to move freely vertically, while preventing horizontal movement. The rod sleeve 48 is secured at its proximal end to the mid-brace 28, shown in more detail in FIG. 4, and to the mid-plate 76 at the distal end. It is critical that the rod sleeve 48 is maintained in a rigid position to prevent movement of the wheelchair. The rod sleeve 48 is fitted with a highly compressed, heavy gauge spring 70 on which the capture rod 46 sits. The proximal end of the rod sleeve 48 must be either closed or provided with a lip to prevent the spring 70 from falling through. The spring 70 serves to force the capture rod 46 into the locked position illustrated in this figure, while allowing for the necessary compression required to place the capture rod 46 in the receiving position illustrated in FIG. 3.

The locking rod 44 is pivotally secured to the mid-brace 28 at pivot point 52 to allow for horizontal movement of the locking wedge 62. The locking wedge 62 is secured to the locking rod 44 and will maintain the capture rod 46 in the receiving position, until released, through its interaction with the wedge shaped receiving area 86. Attached to the locking wedge 62, opposite the locking rod 44, is the release bar 40 which serves to move the locking wedge 62 from the wedge shaped receiving area 86 to the locked position. Removal of the locking wedge 62 from the receiving area 86 allows the capture rod 46 to move upward, driven by the spring 70. The release bar 40 can be affixed to the locking wedge 62 through threading, welding, or other means known in the art. Alternatively, the locking rod 44, locking wedge 62 and release bar 40 can be manufactured as a single element.

Figure 5:
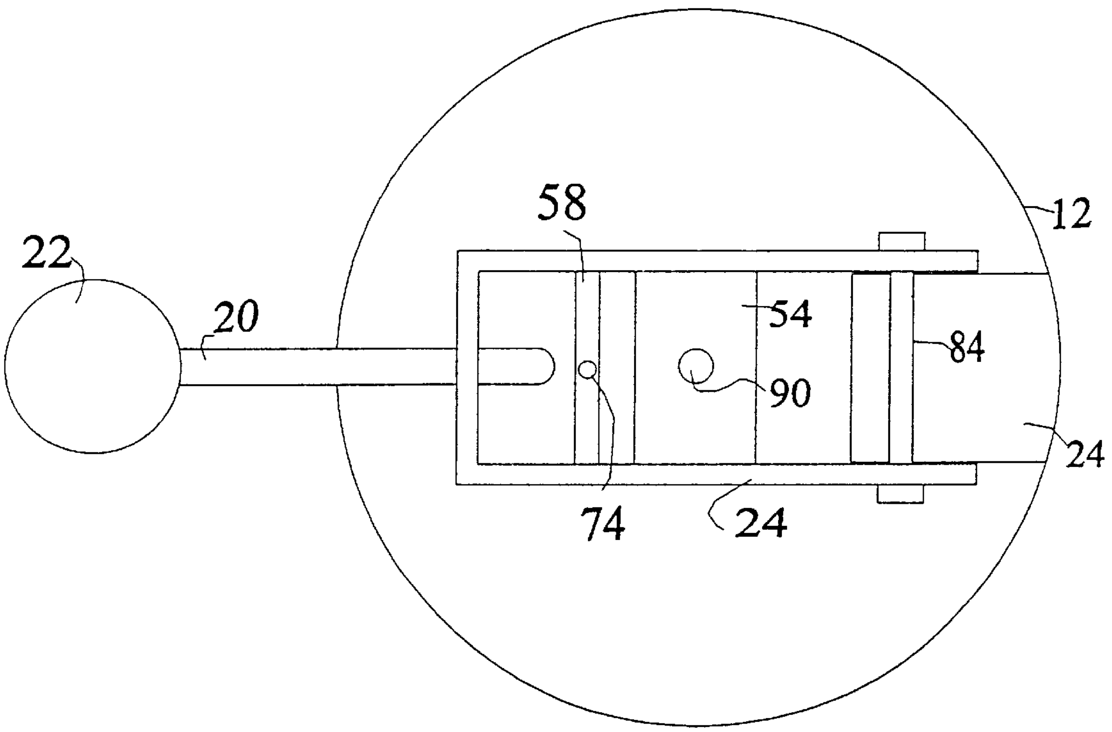
FIG. 5 is a bottom view of the release arm for use with the securement base of FIG. 1.

The release knob connector arm 20 is rigidly connected to the release bar 26. A slot 60 is provided in the wall of the pedestal 12 which allows for the connector arm 20 to freely move vertically within the pedestal 12. The release bar 26, illustrated more clearly in FIG. 5, receives the connector arm 20 at one end through a threaded connection, bolt, or any other means which is evident to those skilled in the art. The release bar 26 is pivotal connected to the release brace 24, at pivot point 84. The release brace 24 must be securely connected to the wall of the pedestal 12 by welding or other appropriate means to prevent the pressure exerted by the release bar 26 from weakening the connection. The release bar 26 also comprises a receiving area 54 for the draw rod 50. The draw rod 50 is attached at the distal end to the capture rod 46 through connector 64 and, at the proximal end, is provided with a end cap, or ball 56. The ball 56 serves to prevent the rod 50 from sliding through the receiving area 54 and therefore must have a periphery greater than the narrowest dimension of the receiving area 54. The draw rod 50 passes through the receiving area 54 at port 90, illustrated in FIG. 5. When the capture rod 62 is in the locked position, the ball 56 is in contact with the port 90. Once the capture rod 46 is in the receiving position, the release bar 26 returns to its original position, with the ball 56 no longer being in contact with the port 90.

The spring 42, in combination with the spring rod 36 and receiving area 72, provide the pressure required to pivot the locking rod 44. In order to allow for the movement of the locking rod 44, the spring rod 36 is allowed to move freely within the receiving area 72. Thus, as the locking rod 44 is moved to the locked position of FIG. 2, the spring rod 36 moves into the receiving area 72 and the spring 42 is compressed. Once the capture rod 46 is placed in the receiving position of FIG. 3, the compression of the spring 42 forces the spring rod 36 forward. The spring 42 must be secured to the spring rod 36 in order to force the rod 36 to move with the spring 42. The spring 42 preferably has a diameter less than the outer dimension of the receiving area 72 to allow for the compression of the spring 42. Alternatively, the length and diameter of the spring can be increased and the compression obtained between the locking rod 44 and the wall of the pedestal 12.

To place the capture rod 46 in the receiving position, the release knob 22 is pressed downward, in the direction of Arrow "A", simultaneously moving the release knob connector arm 20. This also pulls the draw rod 50 downward. As the draw rod 50 is moved downwardly, the connector 64 moves within the channel 66, pulling the capture rod 46 down and compressing the spring 70. As the capture rod 46 moves downward, the wedge shape receiving area 86 of the capture rod 46 is brought into position, allowing the locking wedge 62 to lock into the wedge shaped receiving area 86. The pressure exerted on the locking rod 40 by the spring 72, forces the stop brace 44 into the receiving position illustrated in FIG. 3, preventing any further downward movement as well as release of the locking wedge 62. The knob 22 is returned to an upward position by spring 74, which is connected to the mid-brace 28 at opening 32 and to the release bar 26 at opening 58.

To release, and thereby reactivate the capture bar 46, the tongue 174 is inserted into the receiving channel 68 until it comes in contact with the release bar 40. The receiving channel 68 preferably has a dimensioned slightly greater than the tongue 174, thereby ensuring that the capture bar 46 intersects the tongue port 176. By horizontally moving the release bar 40 away from the tongue 174, the locking wedge 62, which moves in compliance with the locking wedge 62, is removed from the locking wedge receiving area 86. Once the locking wedge 62 is removed from the locking wedge receiving area.86, the pressure exerted by the spring 70 forces the capture bar 46 upward.

Figure 6:
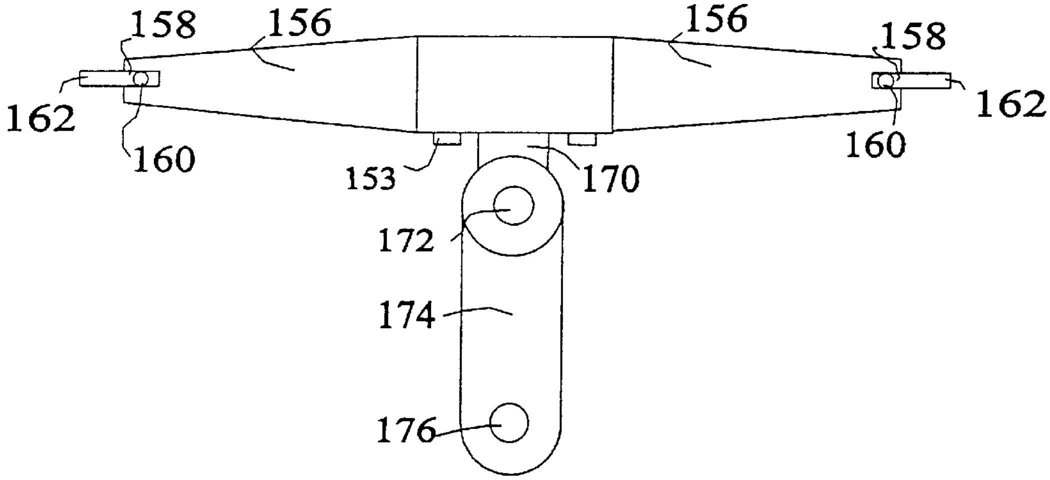
FIG. 6 is a top view of the chair connector for use with the securement base.
Figure 7:
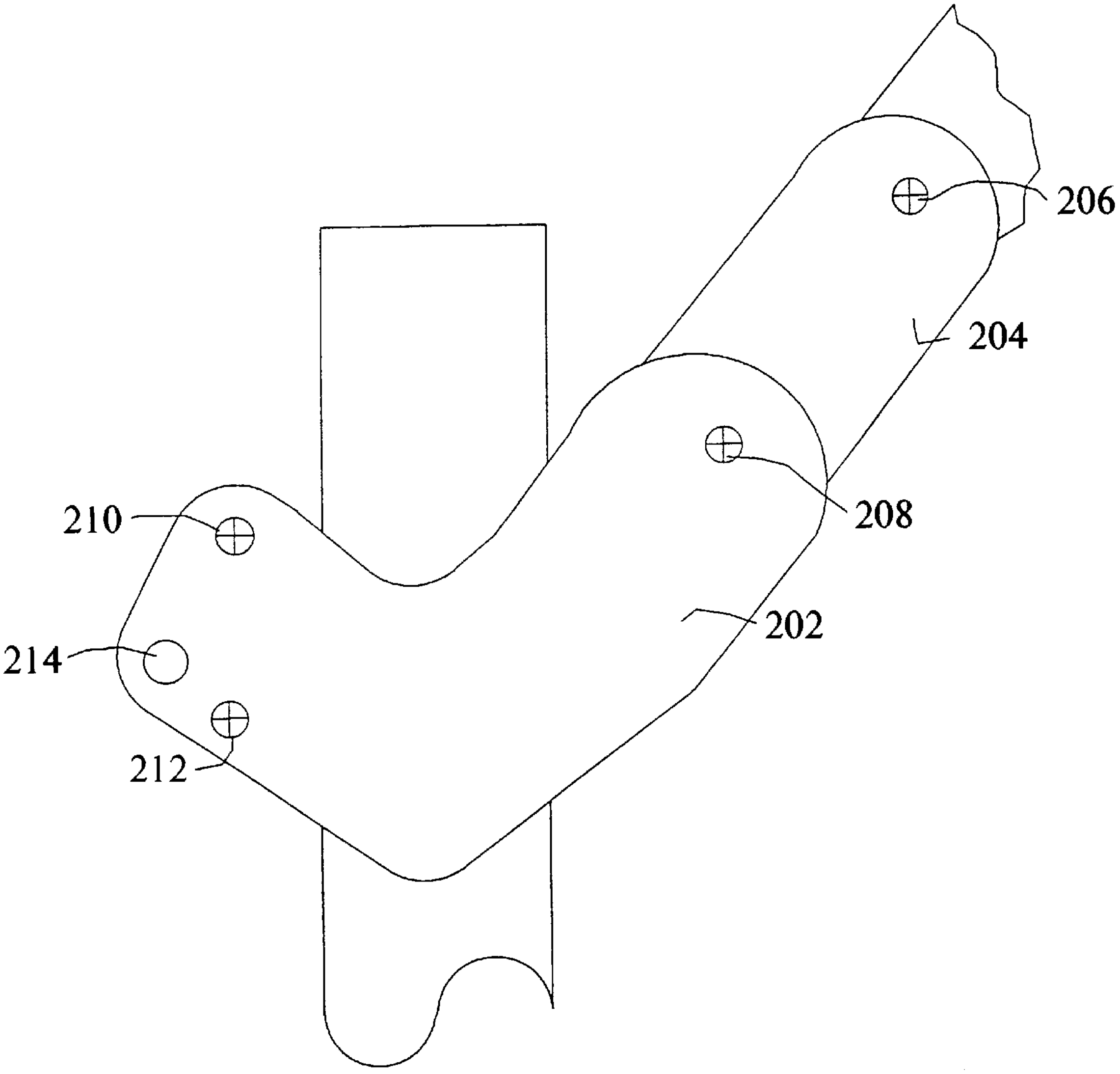
FIG. 7 is a front view of the chair attachment device.

FIG. 6 illustrates the chair connector 150 which would be connected to the wheelchair, or other device, through use of the chair brace 200 of FIG. 7. The arm 156 of the connector 150 is dimensioned to fit within the frame of the wheelchair. The tongue 174 is movably affixed to the arm tongue 170 at swivel point 172. Preferably the swivel point 172 provides about a 20 degree allowance in movement to accommodate horizontal misalignment with the pedestal 12. The arm tongue 170 is connected to the arm 156 through use of a wrap around brace 152 affixed to the arm 156 through use of screws or bolts 153. This is only one means of connecting the arm tongue 170 to the arm 156 and other methods, known to those in the art will become apparent. The criticality lies in the strength and rigidity of the connection, as well as the connector parts. The only movement should be at the connection 172 and is preferably limited to about 20% in the horizontal plane.

The tongue port 176 interacts with the capture rod 46, securing the chair connector 150 to the pedestal 12. Each end of the arm 156 is provided with connection means to secure the connector 150 to the wheelchair. In the embodiment illustrated herein, the connection is made through use of slide pins 162. The slide pins 162 are moved within the arm 156 by sliding buttons 160 within the notch 158. The chair brace 200 is provided with receiving ports 214 which are dimensioned to receive the slide pins 162. Although the slide pins 162 must have the ability to be easily placed in, and removed from, the receiving ports 214, the dimensioning must avoid substantial movement. The body 202 of the brace 200 is affixed to a mirror image (not shown) through use of screws 210 and 212. A brace leg 204 is connected to the body 202 by a screw 208 as well as being attached directly to the wheelchair leg by screw 206. Preferably, the leg brace 204 also has a mirror image counterpart to allow for the added security. By providing a separate connection through use of the leg brace 204, various wheelchair frame angles can be accommodated.

Figure 8:
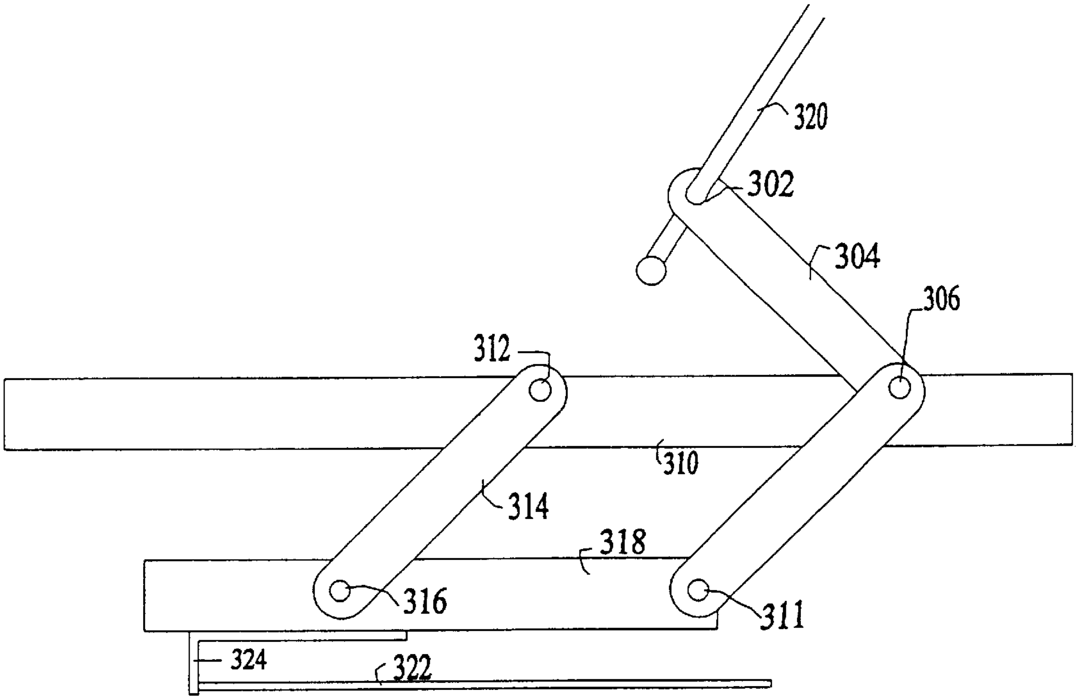
FIG. 8 is a side view of a releasing mechanism to release the mobile aid from the securement base.

In the alternate embodiment of FIG. 8, a cable arrangement is placed within the pedestal for remote operation. The pedestal is fitted with a rocker release 300. A stationary bar 310 is attached to the sides of the pedestal and carries the first pivoting arm 314 which is pivotally connected at the distal end by bolt, rivet or other type connection 312 which allows the pivoting arm 314 to move in relation to the stationary bar 310. The proximal end of the pivoting arm 314 is connected to the hinge bar 318 through use of a non-pivotal connection 316. The other end of the hinge bar 318 is pivotally connected to the stationary bar 310 through use of non-pivotal connection 311 and pivotal connection 306. The hinge bar 318 is provided with L bracket 324 which allows for the connection of the cable 322. The upper rear arm 304 is also connected to the stationary bar 310 at connection 306 and is angled relative to rear arm 308. The rear arm 308 and upper rear arm 304 are permanently connected in relation to one another in order to maintain the the desired angle. The draw rod 320 is connected to the upper end of of the upper rear arm 304 at the port 302. The cable 322 is run to the desired location and is activated with a lever. Although the lever can be of any desired configuration, it is preferable that it provide a mechanical advantage due to the length of the cable. By pulling the cable 322, the hinge bar 318 is pulled in the direction of arrow A. As the hinge arm 318 is pulled, the rear arm 308 and upper rear arm 304 are rotated about connection 306, pulling down on the draw rod 320, thereby pulling down the capture rod as described heretofore. Other release devices can be also used, such pneumatics or high torque levers, and selection of a method will dependent on manufacturer's cost.

Figure 9:
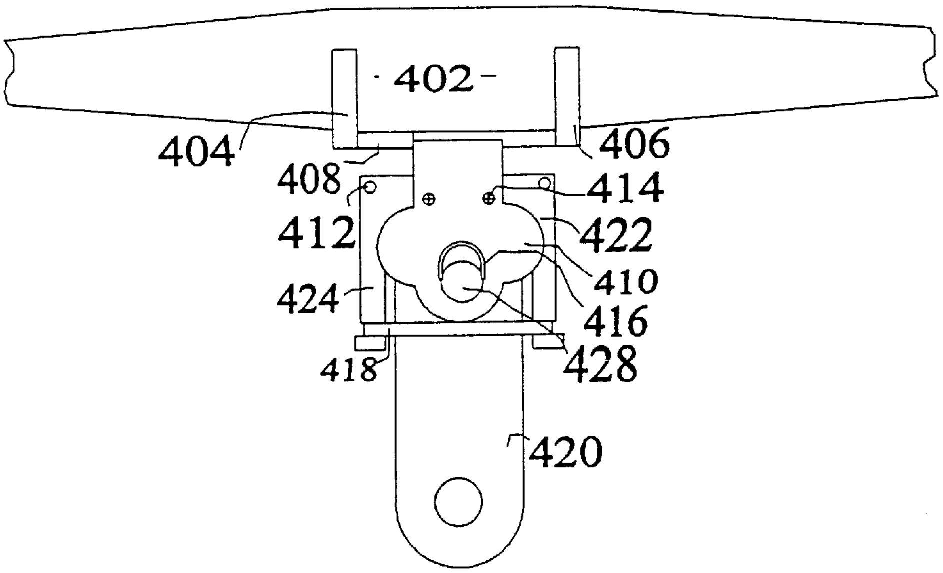
FIG. 9 is a top view of an alternate embodiment of a chair connector.
Figure 10:
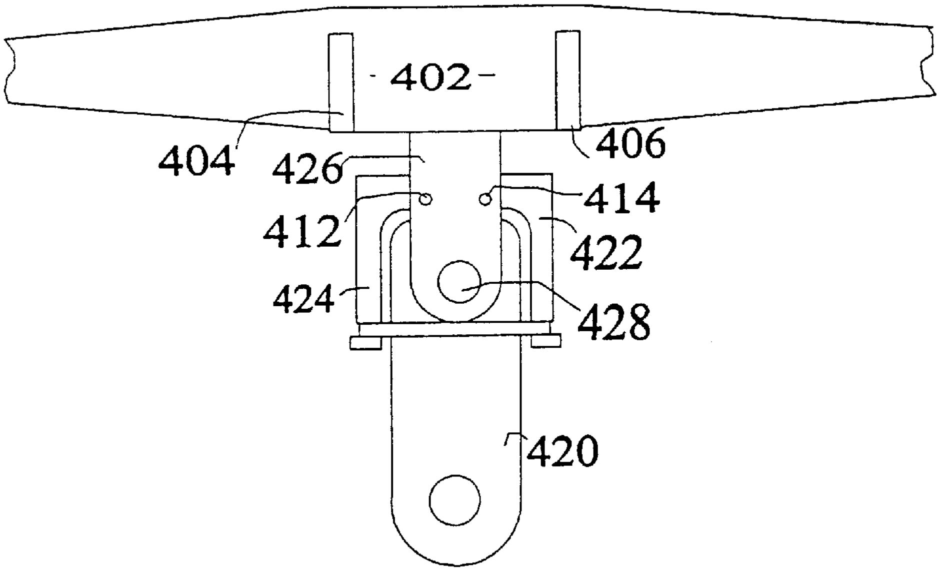
FIG. 10 is a bottom view of the chair connector of FIG. 9.

FIGS. 9 and 10 illustrate the upper and under sides of the preferred chair connector 400. The connector 400 is attached to the chair brace 402 through use of brackets 404 and 406 and support 408. The vertical swing hinge 410 has the ability to move, within a 25 degree range, on a vertical plane. This rotation can be either achieved through movements between the brackets 404 and 406 and the support 408 or, by making support 408 a bar, between the hinge 410 and the bar. The top hinge 410 is secured to the bottom hinge 426 through the use of securing means 414, such as bolts, screws, rivets, etc. The brace legs 422 and 424 are connected with a rubber strap 418 which provides the necessary tension to return the tongue 420 to the normal position after any vertical movement. The tongue 420 is affixed to the swing hinge 410 at the bolt 428 with horizontal movement between the hinge 410 and tongue 420 being inherent in the connection. Stops 412 prevent the hinge 422 from swinging more than the 25 degrees. Further movement is prevented by the natural structure in which the arms 424 and 422 come in contact with the brackets 404 and 406. A loop 416 is secured to the bolt 428 which allows the attachment of straps which can subsequently be attached to the chair.

Although the foregoing is not the only method available for attachment, this provides a simple method to removably attach the connector 150 to the chair, thereby allowing the chair to fold. For chairs, or other non-folding mobile aids, the connector can be permanently affixed to the mobile aid through various means which will be obvious to those skilled in the art.

The pedestals can optionally be provided with visual and/or audio indicator means to indicate that a pedestal is in the unused position. A sensor can be provided within the pedestal which can be set when the capture bar is activated. In the event the capture bar is opened for any reason, without the deactivation of the sensor, an alarm can be sounded. Additionally, each of the pedestals can be wired to the dashboard of the transport vehicle with lights indicating active pedestals.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A securement device system for securing a mobility aid to a support structure, and wherein the mobility aid has a frame to which wheels are connected, said securement device system comprising:

a docking pedestal, said docking pedestal being adapted to be affixed to said support structure, said docking pedestal having an outer casing with a partially open first end, bracket means at a second end, an open port and a hollow interior containing locking means and release means, and further including a mid-brace, said mid-brace being secured to said hollow interior between said first end and said second end and supporting said locking means and said release means;

a release bar, said release bar being pivotally affixed to said hollow interior at a first end and extending through said open port at a second end, said release bar deactivating said locking means;

a release bar spring affixed to said mid-brace at a first end and said releaser a second end;

a mobility aid connector, said mobility aid connector having aid attachment means and docking pedestal securing means, at least a pair of mobility aid braces, said braces having receiving means to receive said attachment means, wherein said securing means interacts with said locking means to removably secure said mobility aid to said docking pedestal.

2. The securement device of claim 1 wherein said securing means is a tongue receiving area, said tongue receiving area being proximate said first end.

3. The securement device of claim 1 wherein said locking means is a vertical sleeve affixed at a first end to said mid-brace and at a second end to said partially open first end forming a length having a receiving area and an open channel, a spring within said vertical sleeve with a first end being proximate said mid-brace and a capture rod within said sleeve and having a first end proximate said spring, a second end proximate said partially open first end and a length having a locking means receiving area.

4. The securement device of claim 3 further comprising a draw rod, said draw rod being affixed to said capture rod at a first end and slideably connected to said release bar at a second end.

5. The securement device of claim 3 further comprising a locking member having a locking rod pivotally connected to said midbrace, a locking wedge at right angles and affixed to said locking rod, a release bar affixed to said locking a and extending into said partially open first end, and a spring on a spring bar affixed to said hollow interior at a first end and in tension contact with said locking rod.

6. The securement device of claim 1 wherein said mobility aid connector means is an attachment bar having releasable attachment locks.

7. The securement device of claim 6 wherein said securing means is a tongue having a capture bar receiving area at a first end and attachment bar affixing means at a second end.

8. The securement device of claim 7 wherein said attachment bar affixing means is a hinge affixed to said attachment bar at a first end, a tongue attachment area at a second end and providing vertical movement between said tongue and said attachment bar.

9. The securement device of claim 6 further comprising stops, said stops being affixed to said attachment bar.

10. The securement device of claim 1 further comprising a mobility aid brace affixed to a portion of the mobility aid frame and wherein said mobility aid brace includes releasable attachment lock receiving areas to receive releasable attachment locks.

11. The securement device of claim 1 further comprising cable release means within said docking pedestal.

12. The securement device of claim 11 wherein said cable release means comprises a stationary bar affixed to said hollow interior, a parallel hinge bar, said hinge bar being pivotally affixed to said stationary bar through at least one pivotally affixed arm, cable attachment means connecting said cable to said hinge bar and an upper arm, said upper arm being affixed to said stationary bar at a first end and to a draw rod at a second, the opposite end of said draw rod being operatively associated with a capture rod, wherein pulling a cable pulls said draw rod and releases said capture rod.

13. The securement device of claim 7 further comprising brace legs and rubber strap, said brace legs and rubber strap preventing said tongue from excessive vertical movement.

* * * * *